US011364737B1

(12) United States Patent
Culton

(10) Patent No.: US 11,364,737 B1
(45) Date of Patent: Jun. 21, 2022

(54) SYSTEM FOR CREATING PERSONALIZED GREETINGS AND LETTERS ON SCROLLS

(71) Applicant: Debra Culton, Henderson, NV (US)

(72) Inventor: Debra Culton, Henderson, NV (US)

( * ) Notice: Subject to any disclaimer, the term of this patent is extended or adjusted under 35 U.S.C. 154(b) by 399 days.

(21) Appl. No.: 16/688,112

(22) Filed: Nov. 19, 2019

(51) Int. Cl.
*B43L 13/20* (2006.01)
*G09B 11/04* (2006.01)
*G09B 11/06* (2006.01)

(52) U.S. Cl.
CPC ............ *B43L 13/208* (2013.01); *G09B 11/04* (2013.01); *G09B 11/06* (2013.01)

(58) Field of Classification Search
CPC ........ B43L 13/208; G09B 11/04; G09B 11/06
USPC .......................................................... 33/564
See application file for complete search history.

(56) References Cited

U.S. PATENT DOCUMENTS

| | | | | |
|---|---|---|---|---|
| 5,575,094 A * | 11/1996 | Leake | ................ | G09F 1/12 40/748 |
| 5,626,551 A * | 5/1997 | Kearns | ................ | B42D 15/045 229/928 |
| 5,829,790 A * | 11/1998 | Phillips | ................ | B42D 15/042 283/117 |
| 6,453,300 B2 * | 9/2002 | Simpson | ................ | G06Q 30/0621 |
| 2001/0018807 A1 * | 9/2001 | Proulx | ................ | G09F 1/04 40/124.01 |
| 2002/0019776 A1 * | 2/2002 | Simpson | ................ | G11B 33/0427 |
| 2004/0258455 A1 * | 12/2004 | Brunetti | ................ | B43K 29/12 401/52 |
| 2005/0263999 A1 * | 12/2005 | English | ................ | B42F 5/00 281/22 |
| 2007/0256338 A1 * | 11/2007 | Bawarsky | ................ | B42D 15/045 40/124.06 |
| 2008/0076095 A1 | 3/2008 | Glicksteins | | |
| 2018/0015777 A1 * | 1/2018 | Sabalaskey | ................ | G06F 30/00 |
| 2019/0299696 A1 * | 10/2019 | O'Malley | ................ | B42D 15/025 |

\* cited by examiner

*Primary Examiner* — Yaritza Guadalupe-McCall
(74) *Attorney, Agent, or Firm* — Sanchelima & Associates, P.A.; Christian Sanchelima; Jesus Sanchelima

(57) ABSTRACT

A system for creating personalized greetings and letters including a scroll assembly, a stencil assembly, and an ink assembly is disclosed herein. The scroll assembly includes a scroll having two posts, wherein the scrolls hold together a sheet of paper. The scroll assembly resembles the form of writing used in the eighteenth century when people wrote messages on scrolls. The stencil assembly includes a stencil that provides a user with multiple images and indicia for writing onto the scroll. These indicia include but are not limited to the English alphabet and numbers for including on the scroll. The ink assembly includes an ink container holding ink wherein a user may use the brush or painting material of their choice to write on the scroll. A user may then use the ink provided to etch the stencil into the scroll to write a personalized greeting or letter.

12 Claims, 2 Drawing Sheets

SYSTEM FOR CREATING PERSONALIZED GREETINGS AND LETTERS ON SCROLLS

BACKGROUND OF THE INVENTION

1. Field of the Invention

The present invention relates to a system for creating personalized greetings and letters and, more particularly, to a system for creating personalized greetings and letters on scrolls that includes a kit comprising of a two-post scroll, a stencil, and ink for writing personalized messages.

2. Description of the Related Art

Several designs for a system for creating personalized greetings and letters have been designed in the past. None of them, however, include a kit for creating personalized greetings, letters, preferably in the form of a scroll. The kit includes a scroll constructed from paper material, a stencil for providing the indicia/image to be written/printed on the scroll, and ink for enabling the printing of the indicia/image onto the scroll. The scrolls can be given as gifts or kept as keepsakes. It is known that individuals often send each other personalized greetings and letters. It is also known that individuals often strive to make letters and greetings as personalized as possible to provide the receiving individual with the most sentimental value possible from the letters and greetings. Therefore, there is a need to provide for a system for writing personalized greetings and letters that provide a user with increased sentimental value.

Applicant believes that a related reference corresponds to U.S. patent (published application) No. 2008/0076095 for a method of calligraphy hand-writing and drawing teaching, kit for hand-writing and drawing teaching. The cited disclosure comprises a graphic element, figure or letter are written with the help of a stencil that is characterized in that at first lines are transferred from a stencil to a paper, then a stencil is moved against a paper, then stencil lines are placed against lines obtained on a paper, and lines are again transferred from a stencil to a paper and after creating required composition or pattern on a paper the obtained drawing is colored. However, it differs from the present invention because the 2008/0076095 reference fails to provide a user with optimized personalization when creating their letter or greeting. The present invention also provides a user with the feel of writing a personalized letter from the eighteen centuries to another individual. The present invention addresses this issue by providing a kit for writing personalized greetings and letters on scrolls including a scroll assembly, a stencil assembly, and an ink assembly, to resemble the feel of writing a letter from the eighteenth century.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a system for creating personalized greetings and letters that allows a user write or draw personalized messages on a scroll for desired individuals.

It is another object of this invention to provide a system for creating personalized greetings and letters that resembles the form of writing from the eighteenth century to provide a user with a personalized and authentic form of writing.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
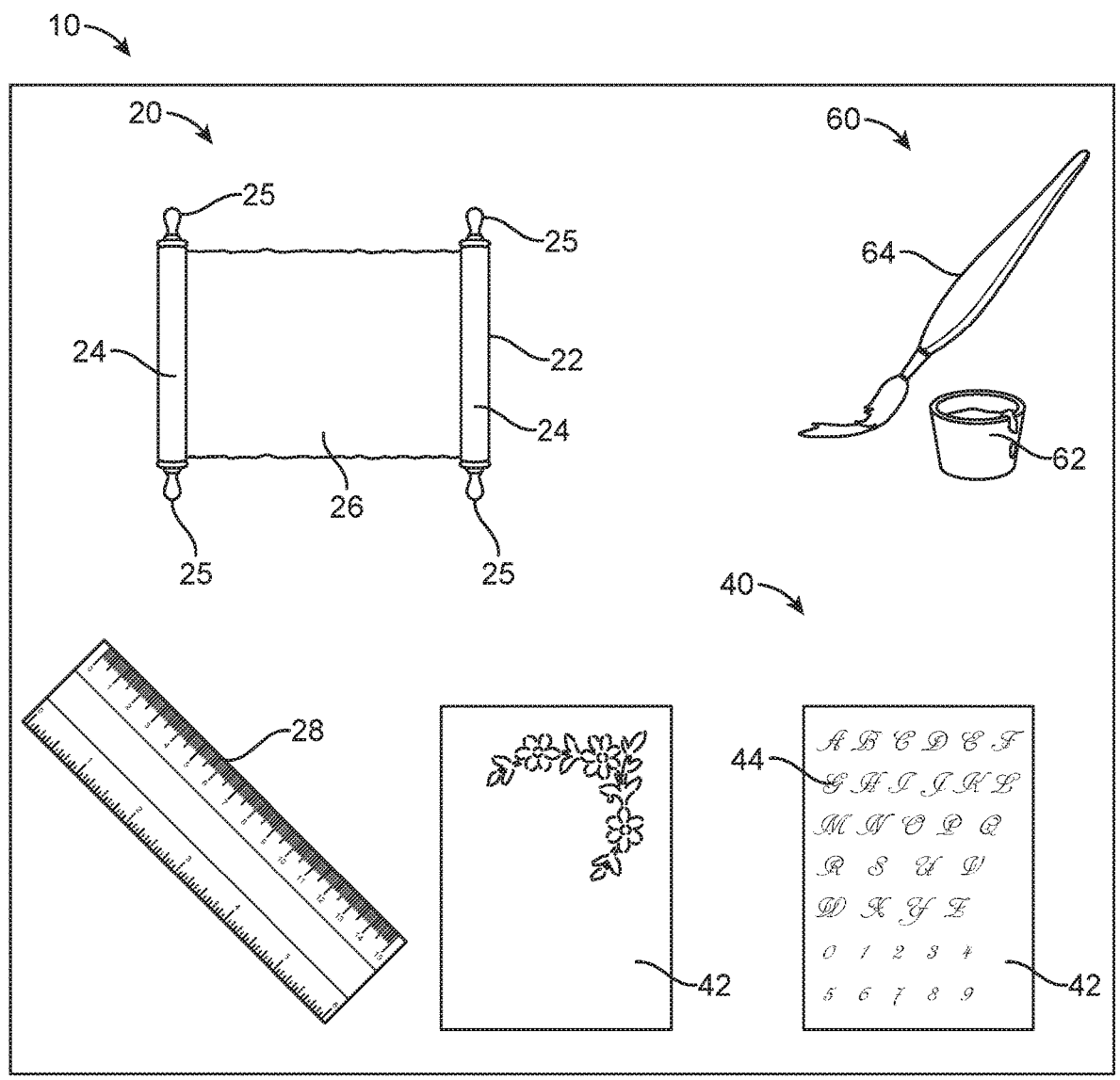
FIG. 1 represents a view of a system for creating personalized greetings and letters on scrolls 10 wherein a scroll assembly 20, a stencil assembly 40, and an ink assembly 60 may be observed in accordance with one embodiment of the present invention.
Figure 2:
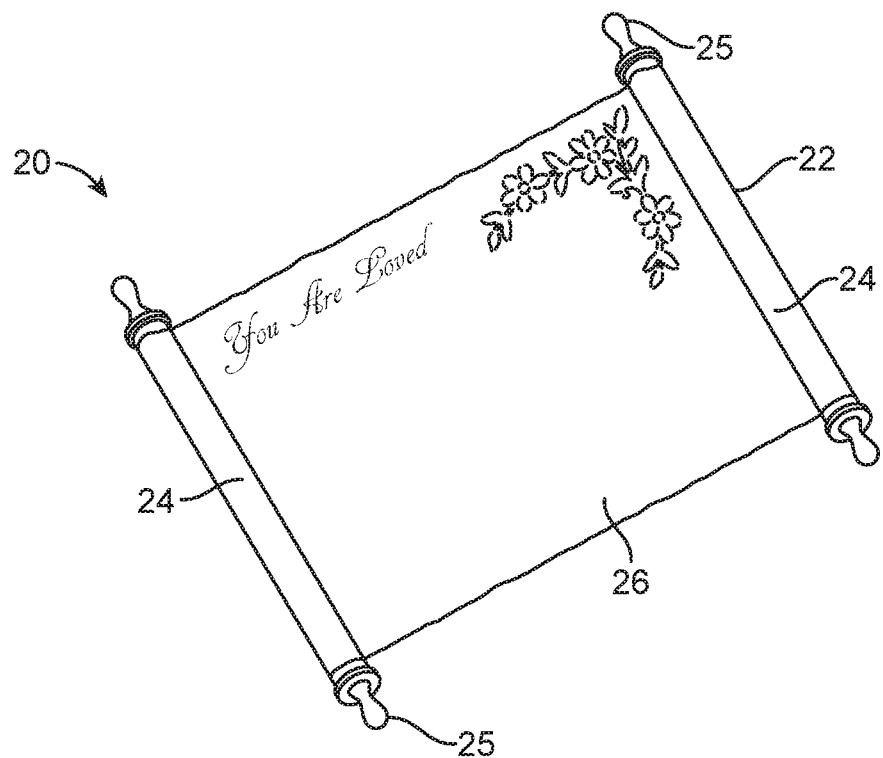
FIG. 2 shows an isometric view of scroll assembly 20 in an open configuration in accordance to another embodiment of the present invention.
Figure 3:
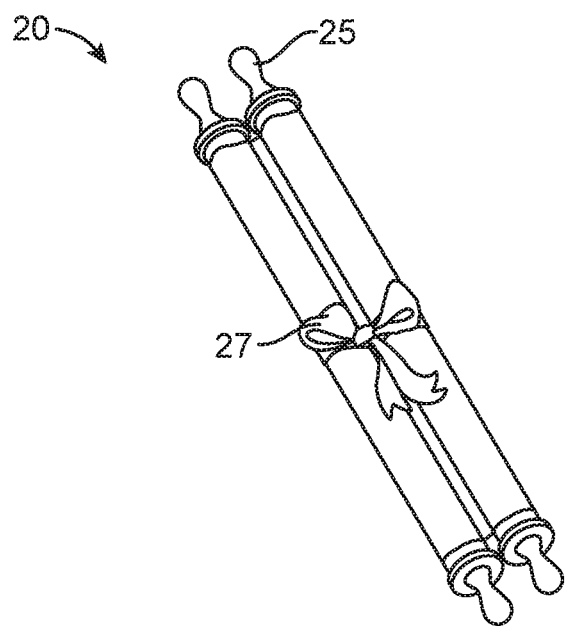
FIG. 3 illustrates another isometric view of scroll assembly 20 in a sealed configuration in accordance to an embodiment of the present invention.

Referring now to the drawings, where the present invention is generally referred to with numeral 10, it can be observed a system for writing personalized greetings and letters on scrolls 10 that basically includes a scroll assembly 20, a stencil assembly 40, and an ink assembly 60.

Scroll assembly 20 includes a scroll 22 having posts 24 having a paper 26 held between posts 24. Posts 24 of scroll 22 may be cylindrical in shape to resemble the posts of scrolls used in the eighteenth century. The present embodiment depicts posts 24 being cylindrical in shape. However, it should be understood that posts 24 may be of any other suitable shape to hold paper 26. In one embodiment, posts 24 may be made of a wooden material to further resemble the posts of scrolls used in the eighteenth century. In one embodiment, posts 24 includes protrusions 25 located at each top and bottom end of posts 24. Protrusions 25 may be of circular shape and made of the same material as posts 24. Additionally, protrusions 25 aid a user in easily rolling and unrolling scroll 22. Furthermore, paper 26 is mounted between both posts 24 using known mechanisms in the art such as adhesives, fasteners, and the like. In one embodiment of the present invention, paper 26 is rolled up between posts 24 for easy storage. In an embodiment of the present invention, paper 26 may be made of a parchment paper material in order to provide a user with maximum longevity to their personalized greeting and letter. Additionally, each end of paper 26 may include an adhesive to aid a user in attaching paper 26 to each of two posts 24. Scroll assembly 20 may further include a ribbon 27 to seal scroll 22 in a closed position. It should be understood, that any form of or configuration of ribbon 27 may be used. In one embodiment, scroll assembly 20 may further include a ruler 28. Ruler 28 may be of a suitable shape and size to be used with scroll 22. It should be understood, that any unit of measurement may be used for ruler 28. Ruler 28 may be used in conjunction with stencil assembly 40 and ink assembly 60. Ruler 28 aids a user in properly aligning a message thereon scroll 22. Additionally, ruler 28 may be a rectangular ruler. In one embodiment, scroll 22 may be rolled into a closed configuration for easy storage. In this closed configuration, a user may store scroll 22 in a comfortable location for safe keeping. Furthermore, scroll 22 may be displayed in an open configuration. In the open configuration, a user may unravel scroll 22 to reveal the paper and a personalized message 29 therein.

Stencil assembly 40 includes at least one stencil 42 having indicia 44 thereon. Stencil 42 may be rectangular in shape and made of a durable strong metal material to allow a user to re-use the stencil as often as possible. However, it should be understood that additional embodiments may include additional stencils of a variety of shapes and sizes to suit to sentimental needs of a user. Stencil 42 may also be used of other materials such as plastic, aluminum, and the like. Indicia 44 is etched into stencil 42 and aids a user in writing their personalized greeting and letter. In one embodiment of the present invention indicia 44 may include the English alphabet and numbers to be stenciled into paper 26. However, it should be understood that indicia 44 is not limited to being the English alphabet and numbers. Indicia 44 may be of multiple languages such as German, Spanish, or any other language and include any desirable font. In another embodiment of the present invention, indicia 44 also includes drawings such as but not limited to hearts, birds, and balloons for a user to stencil the drawings into paper 26.

Ink assembly 60 includes an ink container 62 and a brush 64. Ink container 62 may be cubic in shape and hold black ink therein. Ink container 62 may further be made of a glass material so that a user may observe how much ink is housed within ink container 62. Although the present embodiment depicts a cubic ink container 62 made of a glass material, it should be understood that ink container 62 may be made of any other suitable material and shape for the housing of ink. Additionally, the ink stored within ink container 62 is not limited to being the color black and can be any color to fit the desire of the user. Brush 64 may be cylindrical in shape and of a suitable length for a user to comfortably grip brush 64 to write on paper 26. In the present embodiment, a user utilizes brush 64 dips it into ink container 62. Brush 64 now having ink thereon is used to stencil indicia 44 thereon to paper 26 for a user to write a personalized message 29 or greeting or letter. It should also be understood that the system for creating personalized greetings and letters on scrolls 10, is not limited to being just greetings and letters, a user may write any form of writing on the scroll including scripture, wedding proposals, and valentine's day notes and the like.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for creating personalized greetings and letters on scrolls, comprising:
   a. a scroll assembly, including a scroll having two posts, wherein said two posts are cylindrical in shape, wherein said two posts further include protrusions mounted thereon, wherein said protrusions are located on a top end and a bottom end of each of said two scrolls, wherein said protrusions are circular in shape, wherein said scroll assembly further includes paper held between said posts, wherein said two posts are vertically mounted at opposite ends of said paper, wherein said scroll assembly further includes a ruler, said ruler being rectangular in shape and having measurement indentations thereon, wherein said ruler is configured to aid a user in aligning said paper to their desired configuration;
   b. a stencil assembly, including a stencil having indicia, wherein said stencil is a rectangular stencil having a perimeter, wherein said indicia includes the English alphabet and numerals configured to be used on said paper, wherein said indicia is organized into rows thereon said stencil; and
   c. an ink assembly, including an ink container and a brush, said ink container being a cylindrical container holding ink therein, wherein a user utilizes said brush and ink to etch said indicia of said stencil onto paper, wherein a user writes a personalized message thereon said paper of said scroll assembly.

2. The system for creating personalized greetings and letters on scrolls of claim 1 wherein said paper is parchment paper.

3. The system for creating personalized greetings and letters on scrolls of claim 1 wherein an adhesive is used to mount said paper to said two scrolls.

4. The system for creating personalized greetings and letters on scrolls of claim 1 wherein said scroll is stored in a collapsed configuration.

5. The system for creating personalized greetings and letters on scrolls of claim 1 wherein said scroll is displayed in an open configuration.

6. The system for creating personalized greetings and letters on scrolls of claim 1 wherein said ink container includes a black ink.

7. The system for creating personalized greetings and letters on scrolls of claim 1 wherein said stencil is a cursive English alphabet.

8. The system for creating personalized greetings and letters on scrolls of claim 1 wherein said stencil includes uppercase and lowercase indicia.

9. The system for creating personalized greetings and letters on scrolls of claim 1 wherein said personalized message is a greeting.

10. The system for creating personalized greetings and letters on scrolls of claim 1 wherein said scroll assembly further includes a ribbon to seal said scroll.

11. The system for creating personalized greetings and letters on scrolls of claim 1 wherein said stencil assembly further includes a stencil having a floral pattern thereon.

12. A system for creating personalized greetings and letters on scrolls, comprising:
   a. a scroll assembly, including a scroll having two posts, wherein said two posts are cylindrical in shape, wherein said two posts further include protrusions mounted thereon, wherein said protrusions are located on a top end and a bottom end of each of said two scrolls, wherein said protrusions are circular in shape, wherein said scroll assembly further includes a paper held between said posts, wherein said two posts are vertically mounted at opposite ends of said paper, wherein said paper is a parchment paper, wherein an said paper includes an adhesive at each end to be attached to said two posts, wherein said scroll assembly further includes a ruler, said ruler being rectangular in shape and having measurement indentations thereon, wherein said ruler is configured to aid a user in aligning said paper to their desired configuration, wherein said scroll is stored in a collapsed configuration, wherein said scroll is displayed in an open configuration;
b. a stencil assembly, including a stencil having indicia, wherein said stencil is a rectangular stencil having a perimeter, wherein said indicia includes an English alphabet and numerals configured to be used on said paper, wherein said indicia is organized into rows thereon said stencil, wherein said English alphabet is of a cursive type and includes uppercase and lowercase letters; and
c. an ink assembly, including an ink container and a brush, said ink container being a cylindrical container holding ink therein, wherein said ink is a black ink, wherein a user utilizes said brush and ink to etch said indicia of said stencil onto paper, wherein a user writes a personalized message thereon said paper of said scroll assembly, wherein said personalized message is a holiday greeting.

* * * * *